US009263950B2

(12) United States Patent
Abu Qahouq et al.

(10) Patent No.: US 9,263,950 B2
(45) Date of Patent: Feb. 16, 2016

(54) COUPLED INDUCTORS FOR IMPROVED POWER CONVERTER

(75) Inventors: Jaber A. Abu Qahouq, Tuscaloosa, AL (US); Yang-Ki Hong, Tuscaloosa, AL (US); Seok Bae, Ansan (KR)

(73) Assignee: The Board of Trustees of the University of Alabama, Tuscaloosa, AL (US)

( * ) Notice: Subject to any disclaimer, the term of this patent is extended or adjusted under 35 U.S.C. 154(b) by 676 days.

(21) Appl. No.: 13/098,865

(22) Filed: May 2, 2011

(65) Prior Publication Data
US 2012/0025791 A1 Feb. 2, 2012

Related U.S. Application Data

(60) Provisional application No. 61/330,085, filed on Apr. 30, 2010.

(51) Int. Cl.
*H01F 5/00* (2006.01)
*H01F 27/28* (2006.01)
*H02M 3/158* (2006.01)
*H02M 3/156* (2006.01)

(52) U.S. Cl.
CPC .......... *H02M 3/1584* (2013.01); *H02M 3/156* (2013.01)

(58) Field of Classification Search
USPC ................................. 336/200, 232
See application file for complete search history.

(56) References Cited

U.S. PATENT DOCUMENTS

| 4,133,025 | A | 1/1979 | Wurzburg |
| 5,336,921 | A | 8/1994 | Sundaram et al. |
| 5,572,416 | A | 11/1996 | Jacobs et al. |
| 5,912,552 | A | 6/1999 | Tateishi |
| 6,021,050 | A | 2/2000 | Ehman et al. |
| 6,563,296 | B2 | 5/2003 | Cooke |
| 6,593,841 | B1 * | 7/2003 | Mizoguchi et al. ........... 336/200 |
| 6,900,995 | B2 | 5/2005 | Muegge et al. |
| 7,187,263 | B2 | 3/2007 | Vinciarelli |
| 7,221,251 | B2 | 5/2007 | Menegoli et al. |
| 7,268,659 | B2 | 9/2007 | Nishio et al. |
| 7,292,126 | B2 | 11/2007 | So |
| 7,342,477 | B2 | 3/2008 | Brandt et al. |
| 7,355,264 | B2 | 4/2008 | Degani et al. |
| 2002/0113682 | A1 * | 8/2002 | Gevorgian et al. ............ 336/200 |
| 2003/0156003 | A1 * | 8/2003 | Sortor ........................... 336/200 |
| 2004/0062066 | A1 | 4/2004 | Crocker |
| 2005/0174207 | A1 * | 8/2005 | Young et al. .................. 336/200 |
| 2006/0238273 | A1 * | 10/2006 | Tomonari et al. ............. 333/185 |
| 2008/0129439 | A1 * | 6/2008 | Nishikawa et al. ........... 336/232 |
| 2008/0130257 | A1 | 6/2008 | Li Puma et al. |
| 2009/0225525 | A1 | 9/2009 | Mano et al. |

FOREIGN PATENT DOCUMENTS

JP 2010056177 A * 3/2010

* cited by examiner

*Primary Examiner* — Tsz Chan
(74) *Attorney, Agent, or Firm* — Maynard Cooper & Gale, P.C.; Jon E. Holland

(57) ABSTRACT

The disclosure relates to inductors fabricated on a substrate. A first inductor is formed by depositing conducting material on a first side of the substrate and a second inductor is formed by depositing material on a second side of the substrate. The inductors have the same cross section and the paths of the conducting materials are mirror images and provide magnetic flux on a portion of the substrate when equal currents flow in the inductors.

18 Claims, 9 Drawing Sheets

Assumed with μ = 20, ε = 8, tan δ = 0

COUPLED INDUCTORS FOR IMPROVED POWER CONVERTER

CROSS REFERENCE TO RELATED APPLICATION

This application claims priority to U.S. Provisional Application No. 61/330,085, entitled "Coupled Inductors for Improved Power Converter," and filed on Apr. 30, 2010, which is incorporated herein by reference.

GOVERNMENT LICENSE RIGHTS

This invention was made with Government support under FA9453-06-1-0355 awarded by the United States Air Force. The Government has certain rights in the invention.

FIELD OF THE DISCLOSURE

The present disclosure generally relates to coupled inductors that are connected to other switching power supply components to form a switching power converter. The coupled inductors have a high quality factor and the controller feedback for the switching power supply relies on time measurements and a difference rejection algorithm.

RELATED ART

A DC-DC power converter is used to supply a desired voltage and current to an electronic system. The converter receives an input voltage and delivers a regulated voltage and current to such a system. Depending on the power requirements, the DC-DC power converter may be a stand alone device, a component of an AC-DC power converter, or a component of a DC-AC power inverter. Power converters are used in a wide range of applications that include, but are not limited to, high performance computing platforms, mobile platforms, medical platforms, electric and hybrid vehicles, space power systems, military power systems and renewable energy power conversion systems.

Power converters are based on a variety of technologies including switching converters and linear regulator converters. In general, switching DC-DC power converters have the advantage of higher energy efficiency when compared with linear regulator converters. However, the switching DC-DC power converter is usually larger than a linear regulator converter because the switching converter requires magnetic devices such as power inductors and/or a power transformer. In addition, switching converters require more switching power devices and control circuits when compared to the linear regulator converter. Even with such shortcomings, the switching power converter is widely used, especially when conversion efficiency is crucial.

In general, switching power converters comprise electrical components mounted to and fabricated on a printed circuit board (PCB) or integrated on a chip. Switching devices for power converters are typically MOSFETs that are available in a variety of power ratings and switching speeds. Other components for a switching power supply include capacitors, resistors, control logic, and inductors. Inductors may be surface mount inductors or may be fabricated on the substrate of the printed circuit board. They can be integrated on a silicon substrate or other substrate type inside a chip. The inductors of switching power supplies should have a high quality factor, Q, in order to limit resistive energy loss and yield high inductance value. In addition, the control circuitries and sensors result in additional energy losses, which should be minimized.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Figure 1:
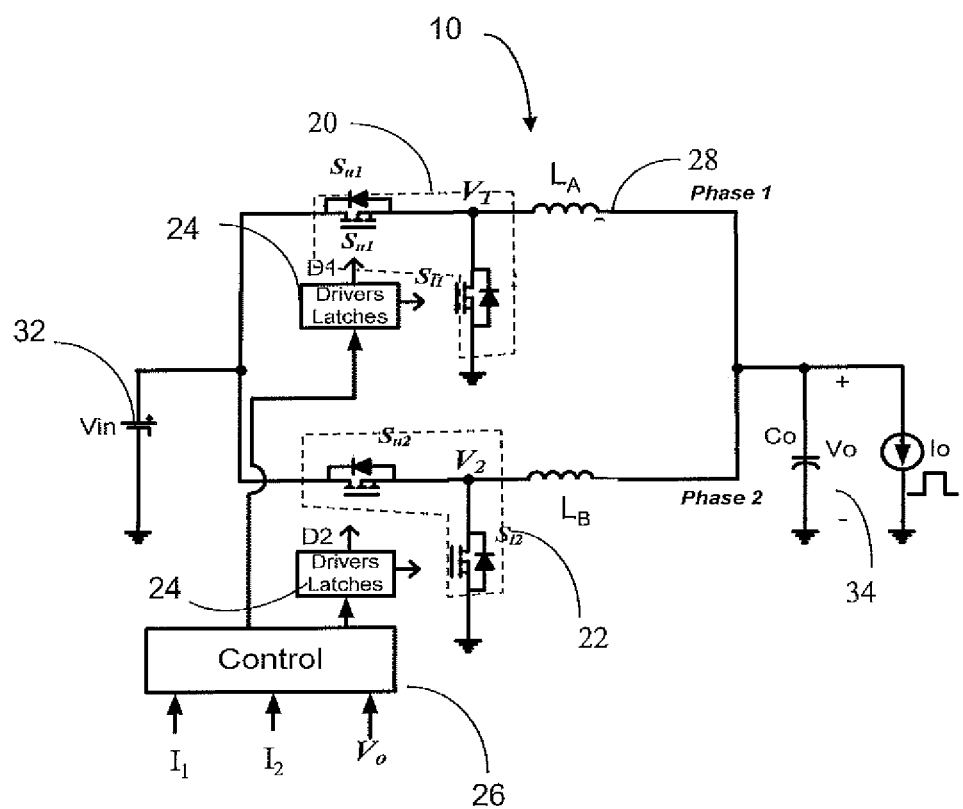
FIG. 1 is a circuit diagram for a conventional switching converter.

A schematic of a conventional switching power supply 10 is shown in FIG. 1. An input voltage, $V_{in}$, 32 from a power source is applied at an input node. The power source supplies the energy for the output of the switching power supply 10. The switching power supply 10 has an output voltage, $V_o$, 34 and an output current $I_o$. The output voltage 34 has a desired voltage value to meet the needs of an attached device. The output voltage 34 is usually lower than the input voltage 32, but for some switching power supplies, the output voltage could be higher. The output voltage 34 typically supplies energy to electronic components (not shown) that are used in communication devices, cell phones, commuters or other such devices.

The conventional switching power supply 10 has switching devices, such as MOSFETs, inductors $L_A$ and $L_B$, and other components. The inductors store and release energy as directed by a controller 26 and the switching devices of the converter. The inductors and other components of the switching power supply may be mounted on a printed circuit board (PCB) or a substrate of a chip. The inductor coils may also be fabricated during circuit formation for the PCB and followed by mounting components of the switching power supply on the PCB. Because the inductors are typically larger than the other components of the switching power supply, the inductors take up a large portion of the surface area of the PCB or integrated chip. The inductors may be discrete components, may be fabricated on the PCB, or integrated on a substrate inside a chip using techniques known to those skilled in the art. In general, it is desirable to have inductors with low DC resistance and low core losses in order to limit power losses in the switching converter 10 and be able to reduce the size of the inductor. One measure of the value of an inductor is the inductor's quality factor, Q, sometimes expressed as ωL/R for an inductor, where L is the inductance in Henries, R is the resistance of the inductor in Ohms, and w is frequency in radians per second. In general, the higher the Q the better the inductor.

The conventional controller 26 of the power supply 10 has inputs $I_1$, $I_2$ and $V_o$, i.e., their measured values and the conventional controller responds to the inputs by generating control signals to drive switches of the power supply 10. The actual currents $I_1$, $I_2$ are the currents flowing through, respectively, inductors $L_A$ and $L_B$. The values of currents $I_1$ and $I_2$ that are coupled to the controller 26 come from current sensors (not shown). Various control algorithms, well known to those in art, may be used for the conventional controller 26. In general, the controller 26 selects the off and on positions of the MOSFETs so that the currents in each of the inductors are driven towards desired values. The desired value of current in the inductors depends on the load attached to the power supply and its design and operating condition.

Figure 2:
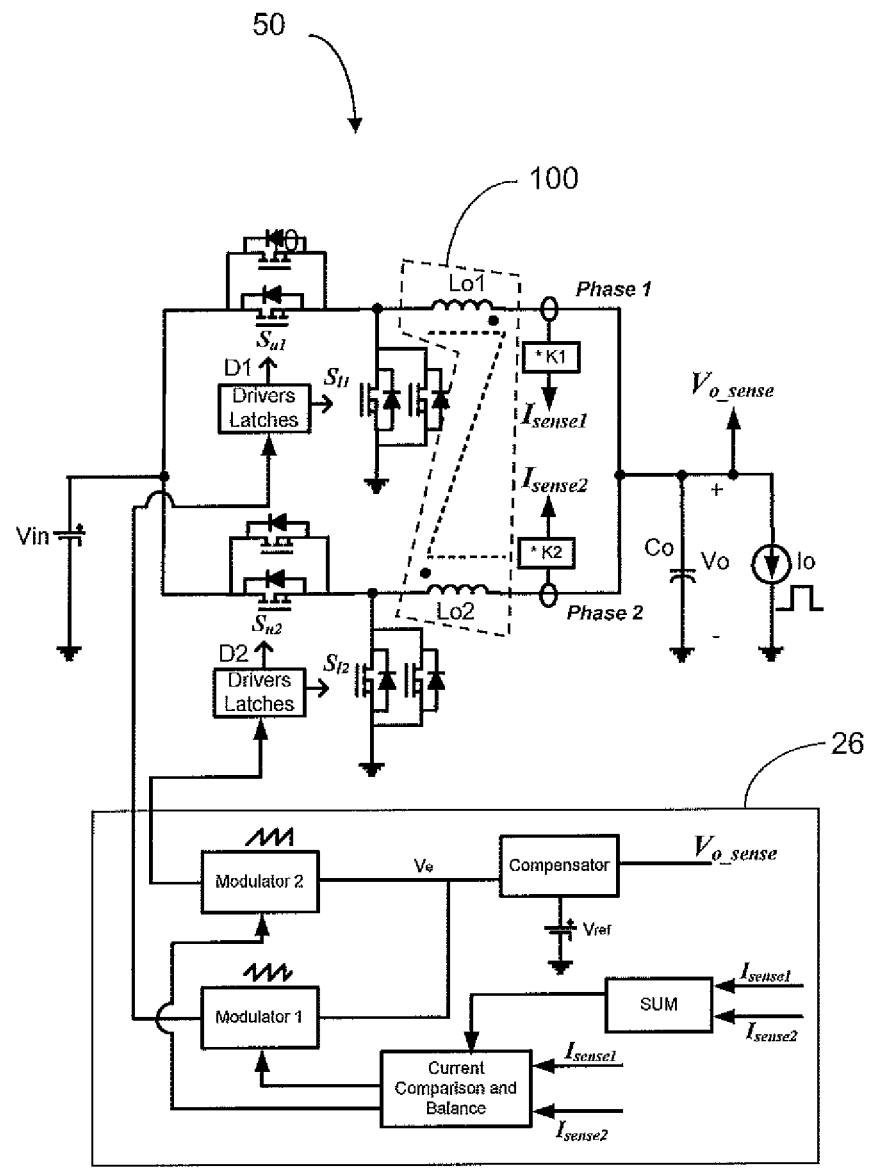
FIG. 2 depicts an embodiment of switching converter in accordance with the present disclosure.

An embodiment of an improved power supply 50 having vertical coupled inductors (VCI) 100 is depicted in FIG. 2. The improved power supply 50 has other conventional components as shown in FIG. 1. However, the inductors, $L_1$ and $L_2$, of the improved power supply have a structure that provides for reduced PCB space and a reduction in magnetic interference with components mounted to or deposited upon the PCB. The exemplary VCI 100 of FIG. 2 comprises two inductors L1 and L2, and the inductors are coupled to each other via a mutual inductance, M. Hence, the voltage across one of the inductors is dependent not only on its own current, but current flowing in the other inductor. The coupling characteristic of the mutual inductance linking the inductors is indicated by the well-known dot notation shown on the diagram. For the embodiment of the improved power supply 50 of FIG. 2, a conventional controller 29 that relies on current values and $V_o$ is used. Other embodiments of the improved power supply use other controller arrangements as will be seen.

In general, a reduction in the size of an inductor can be achieved by using improved magnetic materials and improved fabrication techniques. Another method for reducing inductor size is to increase the switching frequency of the converter. However, increasing the switching frequency generally increases energy losses in the power converter and in the inductor itself thereby decreasing energy efficiency. Further, the allowable switching frequency often depends on the technology (CMOS technology and feature size) used to integrate the power converter switching devices, and it depends on the high-frequency properties of magnetic materials of the inductors. For both the conventional power supply 10 and the improved power supply 50, 0.25 μm CMOS technology may be used for the switching power devices (MOSFETs) because of its wide use, low cost, and an ability to handle high voltages. For other embodiments of power supplies, the use of 90 nm or smaller CMOS technology allows for higher switching frequencies than the 0.25 μm CMOS technology because of smaller capacitive parasitic and larger resistive parasitic of the transistors. In yet other embodiments, other technologies may be used.

Figure 3A:
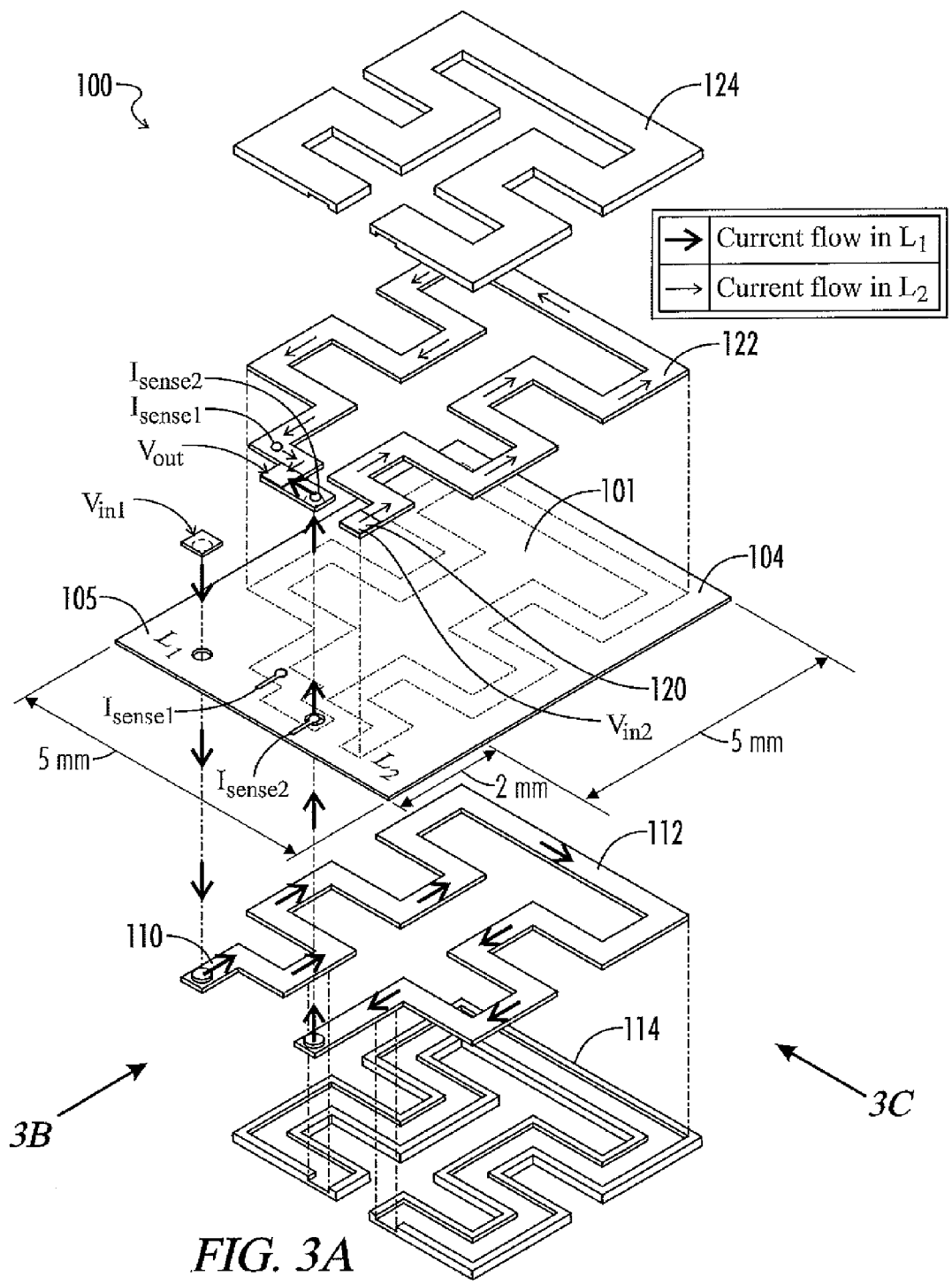
FIG. 3A is an exploded perspective top view of an embodiment of a vertical coupled inductor in accordance with the present disclosure.
Figure 3B:
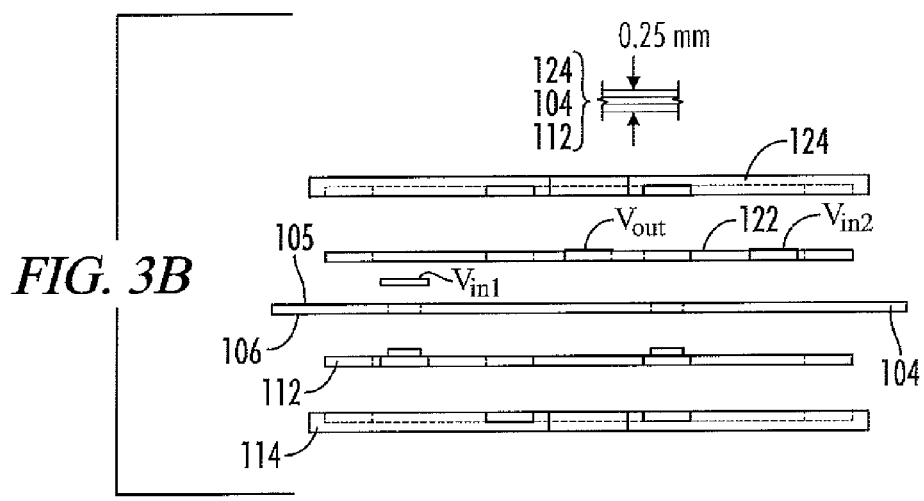
FIG. 3B is an exploded front view of the embodiment of FIG. 3A.
Figure 3C:
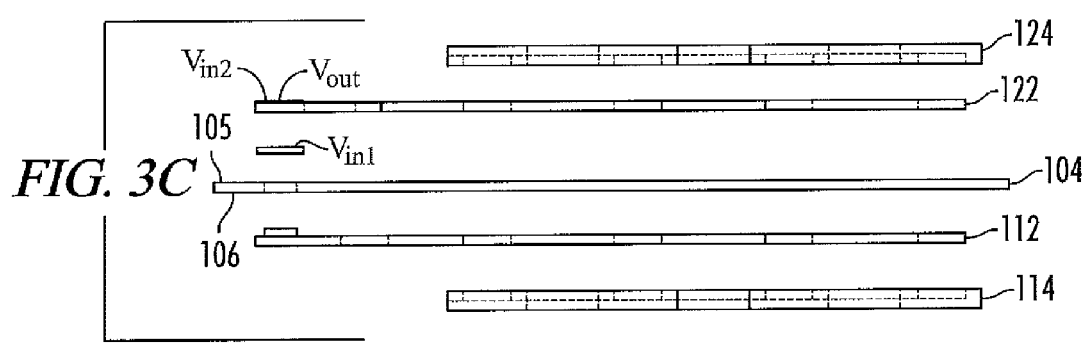
FIG. 3C is an exploded side view of the embodiment of FIG. 3A.

FIG. 3A shows the structure of the VCI 100 in a top view. The dimensions of the PCB (approximately 5 mm by 7 mm) are exemplary values and other dimensions are possible in other embodiments. The phase one inductor, L1, 110 of the VCL 100 comprises a conductor 112 covered by a ferrite 114. The phase 2 inductor L2 120 comprises a conductor 122 covered by a ferrite 124. In other embodiments, other materials may be used. The conductors 112 and 122 are formed by depositing conducting material, such as copper, on the substrate 104 of the PCB. The conductors have a cross section that is chosen to provide a desired resistance. The path of the conductors 112, 122 has a shape that provides a desired inductance. The shape of the path as shown on FIG. 3A is essentially rectangular with zig-zags and has path ends located near one another. The ends are the terminals of the inductor. The path shape provides an interior area 101 as shown in FIG. 3A. Other path shapes are possible in other embodiments, such as, for example a circular shape. Each of the conductors 112 and 122 are then covered by deposition of ferrites 114 and 124. The ferrites may be composed of a variety of materials and typically have a relative permeability of approximately 10 or more. A front view of the VCI 100 is shown in FIG. 3B and a side view in FIG. 3C to provide additional detail.

Figure 4:
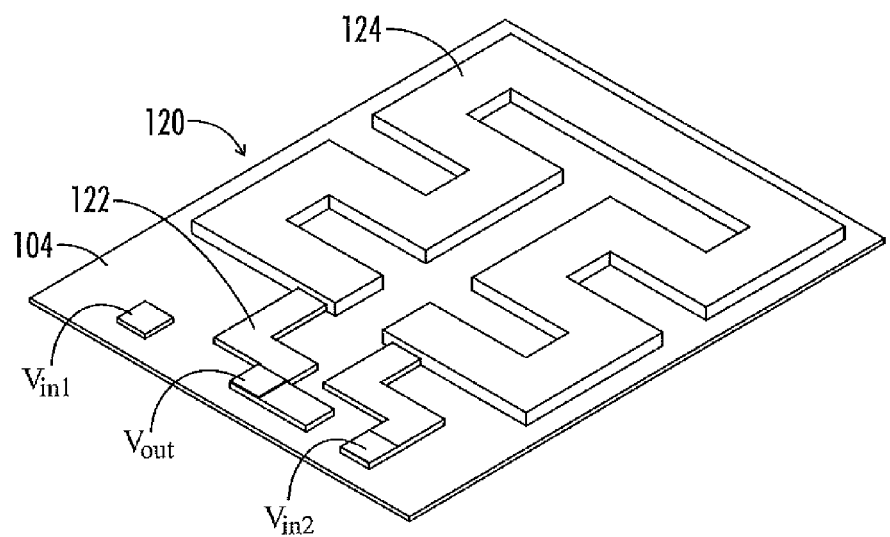
FIG. 4 shows details for the embodiment of FIG. 3A.

The view of the VCI 100 of FIG. 4 shows details of the layers of material deposited on the substrate 104. Except for the end points, a first conductor 112 of the phase 1 inductor and of a second conductor 122 of the phase 2 inductor follow the same path but are separated by the substrate 104. The conductors 112 and 122 are essentially mirror images of one another with the substrate 104 separating the conductors. Because the substrate 104 is made of an insulating material, the only contact the first conductor has with the second conductor is at the output terminal of the VCL 100. The other end of the first conductor and other end of the second conductor are available for connection to the switches of the power supply or other system that may use the VCL 100.

Figure 5:
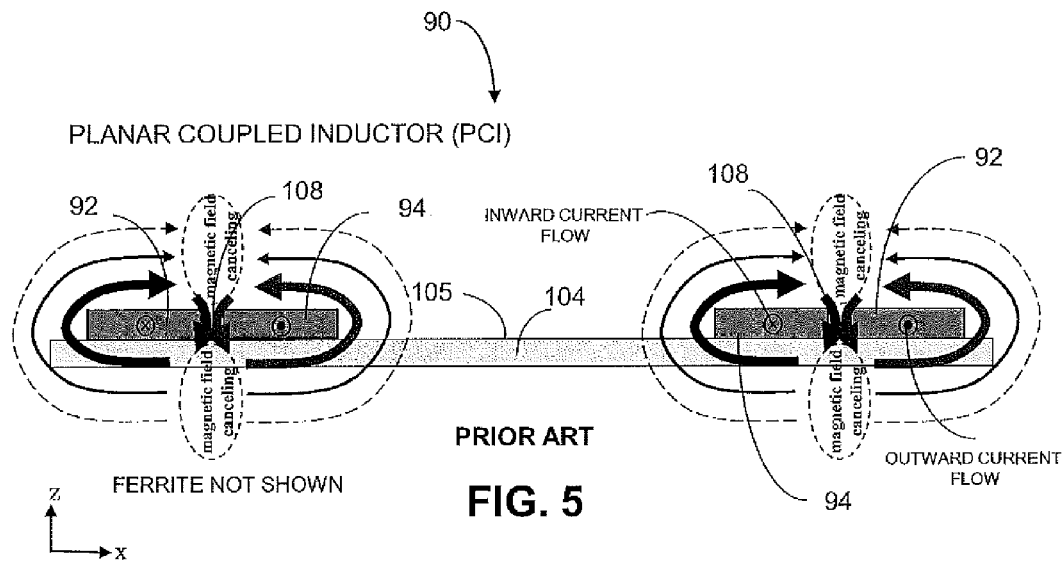
FIG. 5 is a cross-sectional view of an embodiment of a planar coupled inductor depicting magnetic fields about the planar coupled inductor.

A planar coupled inductor (PCI) 90 (a prior art inductor) is depicted in FIG. 5 as a cross-sectional view. A first PCI conductor 92 is the conduction path for phase 1 inductor and a second PCI conductor 94 is the conduction path for phase 2 inductor. The path taken by the conductors on the top side 105 of the substrate 104 can have a variety of shapes, such as the shape shown in FIG. 3A for the VCI 100. The circle with an interior X, shown on the left side and right side of FIG. 5 indicates current is flowing inward when viewing the figure. The circle with an interior dot indicates current is flowing outward when viewing the figure. The magnetic field produced (using well-known theory) by the current flows in the PCI 90 have magnetic cancellation directly above and below the gap 108 between the conductors 92 and 94. To the left and right (the minus x and plus x directions) of the conductors 92 and 94, magnetic energy is coupled into the substrate and will generally have a detrimental effect on components mounted on that area of the PCB or chip. Hence, in order to avoid or reduce interference from magnetic fields of the PCI 90, it may be desirable to place components of a power converter far from the PCI.

Figure 6:
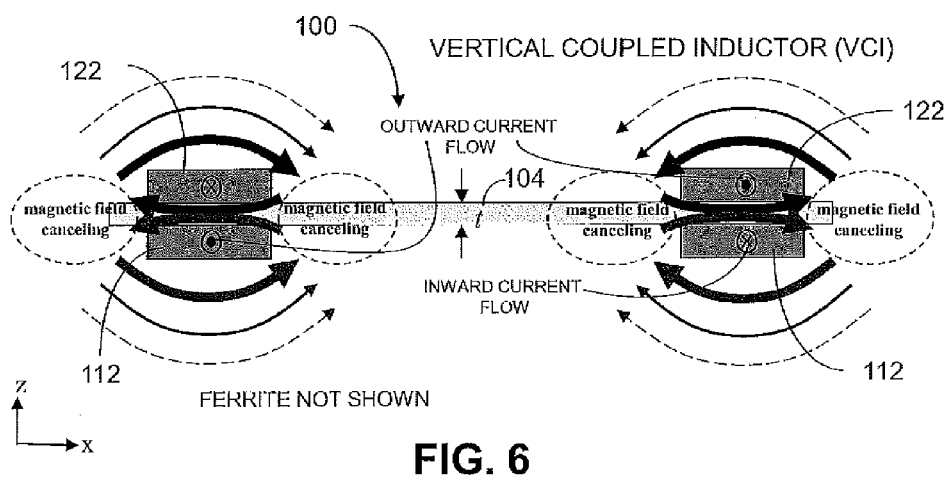
FIG. 6 is a cross-sectional view of an embodiment of a vertical coupled inductor depicting magnetic fields about the vertical coupled inductor.

FIG. 6 shows the cross-sectional view of a VCI 100 having conductors 112 and 122. The direction of current flow in the conductors is again illustrated by the circle with an X and the circle with a dot. Current flow, in the conductors of the VCI, causes magnetic cancellation, as shown, directly adjacent to the outside edges of the conductors. Hence components of a power converter may be placed close to the VCI without having the magnetic interference produced by the PCI 90. Thus, there is more useable area on the PCB having the VCI 100 than on the PCB having the PCI 90. In addition, the VCI 100 takes less board space since half of the VCI is on the bottom of the PCB or the substrate on a chip. This works because the VCI uses the same core (for the two inductors) rather than two separate cores and they exhibit better flux cancellation which means lower power losses and less heat produced.

Figure 7:
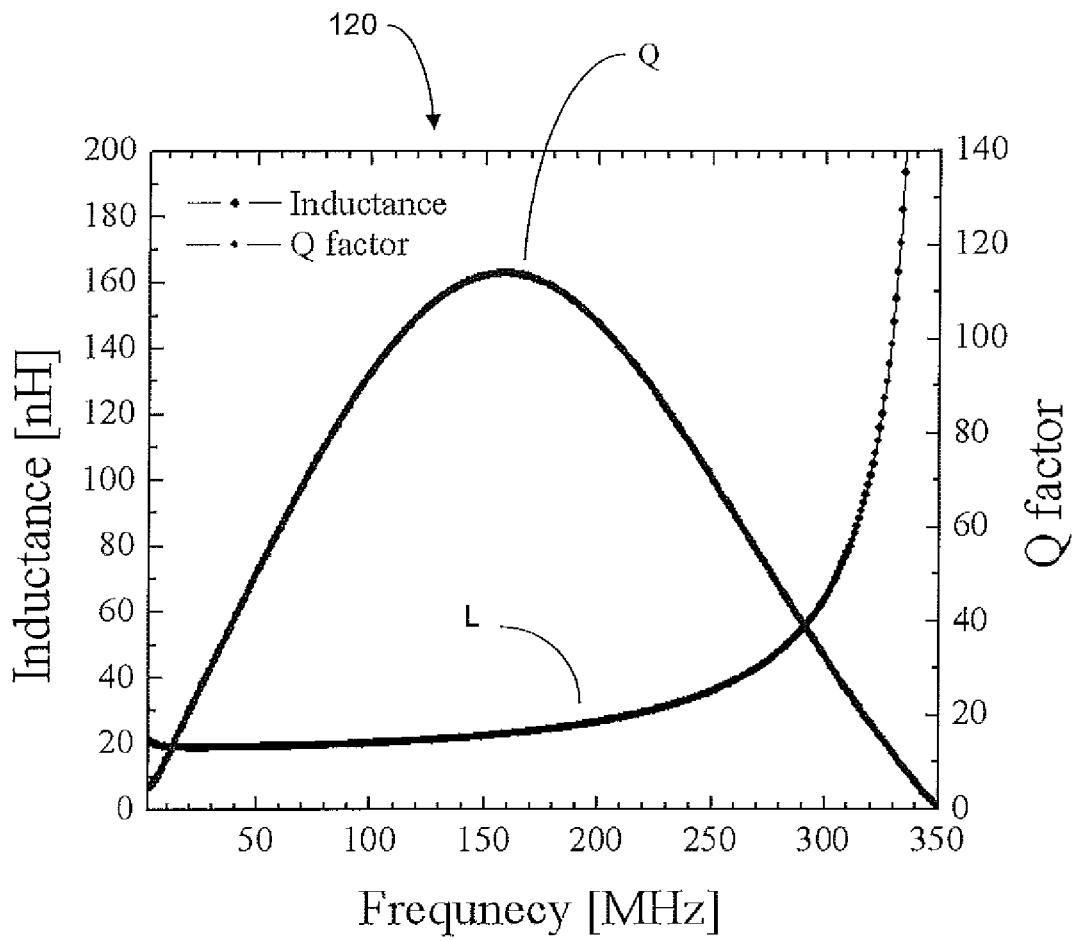
FIG. 7 shows exemplary characteristics of an embodiment of a vertical coupled inductor in accordance with the present disclosure.

The characteristics 120 of a VCI 100 are shown in FIG. 7. The inductance is a function of frequency and varies from around 20 nanoHenries to over 200 nanoHenries. The Q of the VCI, as shown in FIG. 7, has its greatest value of around 160 at a frequency of about 150 megahertz. The Q of the coupled inductor is dependent on DC resistance and AC resistance between two terminals of the inductor, and on proximity effect, magnetic loss, and magnetic flux coming out of the inductor coil.

To achieve a high Q factor, the above factors should be minimized, while maintaining a high magnetic flux. The DC resistance is inversely proportional to the cross sectional area of the inductor coil, while AC resistance is related to the skin depth (coil thickness<the skin depth). On the other hand, the proximity effect is related to coil design (spacing), and permeability and geometry of magnetic material. The magnetic loss is an intrinsic property of magnetic material. Magnetic flux increases with the length and number of turns of coil and permeability of magnetic material. Therefore, the geometry of both inductor coil and magnetic material, and magnetic material properties need to be considered when designing a VCI 100 or any other inductor.

The value for Q for the VCI could be the same for other inductors or higher if similar materials and geometries are used. Simulation of a VCI and a PCI show that values of inductance and Q are about the same or higher for similar structures. Another advantage of the VCI is that it takes less space and reduces magnetic interference with components mounted on the PCB or in a chip.

Figure 8:
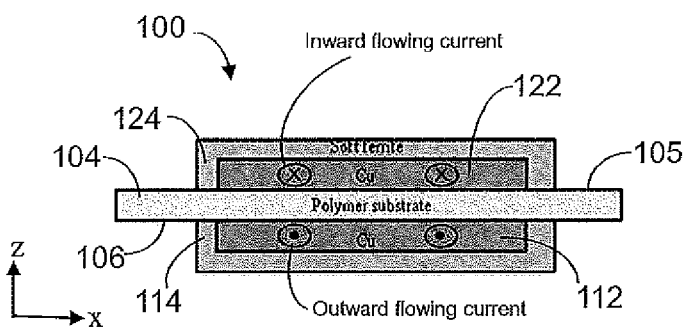
FIG. 8 depicts fabrication details of an embodiment of a vertical coupled inductor.

FIG. 8 illustrates a cross-sectional view for an embodiment of the VCI 100. If cross section of the conductors 112 and 122 is increased, the resistance of the inductor is decreased. If the cross section of the ferrite material 114 and 124 is increased, then the inductance is increased.

Figure 9:
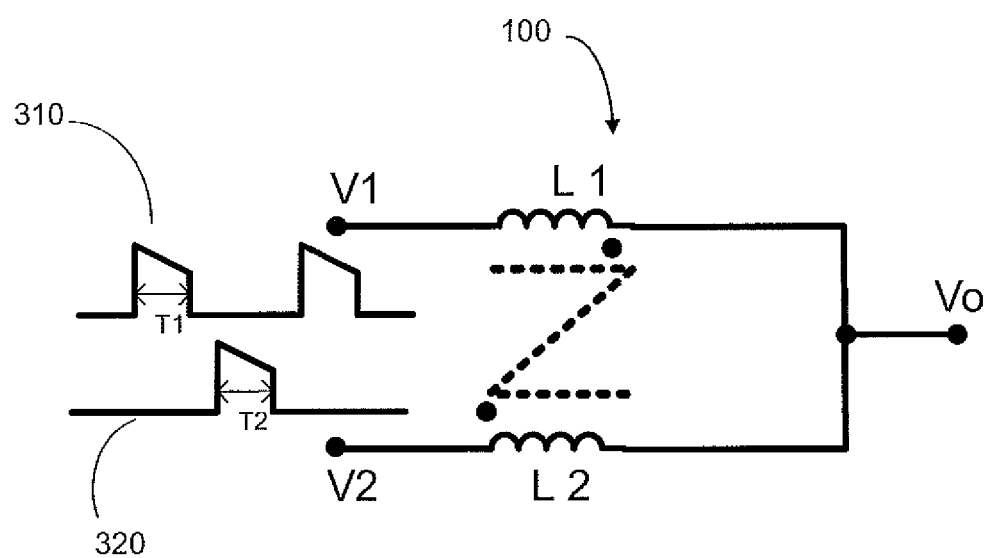
FIG. 9 illustrates voltages applied to the input terminals of a vertical coupled inductor.

The VCI 100 is a three terminal device as shown in FIG. 9. One terminal is a common terminal indicated by Vo. The phase 1 inductor L1 has an input terminal V1, and the phase 2 inductor L2 has an input terminal V2. The waveforms applied to the input terminals of an improved power supply using the VCI 100 typically have waveforms as shown in FIG. 9. The two dots at the corners of the dotted 'Z' represent the polarity used for the mutual inductance, M.

Figure 10:
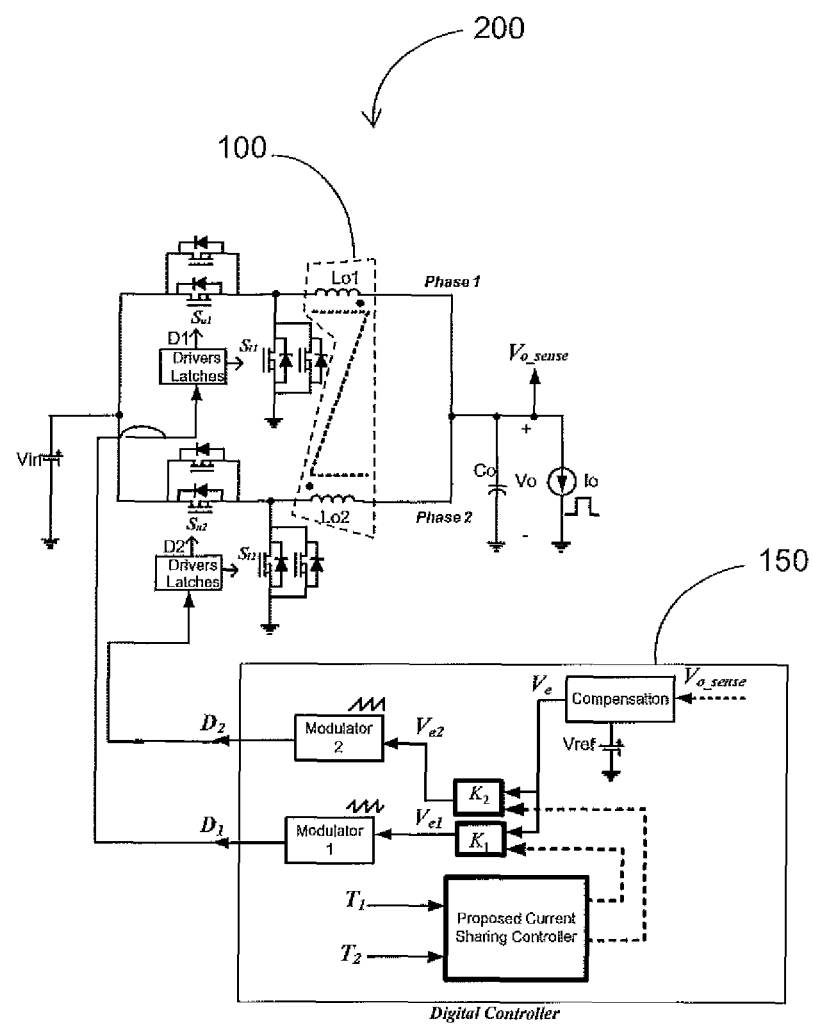
FIG. 10 shows an embodiment of a switching power supply in accordance with the present disclosure.
Figure 11:
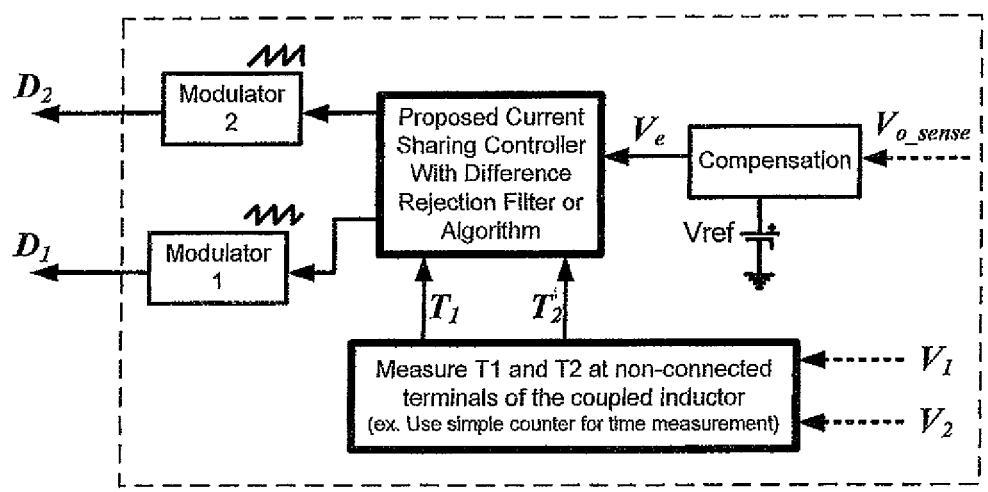
FIG. 11 shows details of another embodiment of a controller for the switching power supply of FIG. 10.

Another embodiment of an improved switching power supply is shown in FIG. 10. The VCI 100 is connected to the switches of the converter as shown. The current sensors shown on the diagram are not used. Instead, a voltage sensor is placed at the input terminals of the VCI 100 to determine when a voltage is present and to record the on time and/or the off time of the voltage. The amount of time a voltage is present on the input terminal of V1 is defined as T1. The amount of time a voltage is present on the input terminal of V2 is defined as T2. T1 and T2 are inputs to the controller 150. An additional input to the controller is the output voltage. The output voltage is compared with a reference voltage and provides and error voltage, Ve. The variables Ve, T1, and T2 are used to generate control signals for the switches of the power supply. K1 and K2 are gain factors. Additional details for the controller 150 are shown in FIG. 11.

For another embodiment of the disclosure a controller maintains the current distribution between the two windings of the VIC without the need for current sensing. The controller measures V1 and V2 at the non-connected terminals of the VIC and extracts the time information T1 and T2 from the measured V1 and V2. T1 and T2 could be either the ON times or the OFF times of V1 and V2 (refer to FIG. 10 and FIG. 11). The controller utilizes a difference minimization algorithm, circuit or/and amplifier to actively minimize the difference between T1 and T2 toward zero.

The controller drives the difference between T1 and T2 toward zero by adjusting K1 and K2 shown in FIG. 10. When the controller adjusts the value of K1 and K2, the values of T1 and T2 are expected to change. For example, the controller may increase K1 and decrease K2 such that T1 is increased and T2 is decreased in order to reduce the difference between them, or vice versa.

Now, therefore, the following is claimed:

1. A vertically coupled inductor, comprising:
a first inductor having a first conductor and a first ferrite formed on the first inductor, the first ferrite extending along a length of the first conductor such that a path of the first ferrite corresponds to a path of the first conductor; and
a second inductor having a second conductor and a second ferrite formed on the second conductor, the second ferrite extending along a length of the second conductor such that a path of the second ferrite corresponds to a path of the second conductor, wherein the first conductor mirrors the second conductor on an opposite side of a substrate, and wherein the first and second conductors are mounted so that magnetic fields generated by the first and second inductors are cancelled.

2. The vertically coupled inductor of claim 1, wherein each inductor has a dedicated terminal and a shared terminal.

3. The vertically coupled inductor of claim 1, wherein the first ferrite is formed directly on the first conductor, and wherein the second ferrite is formed directly on the second conductor.

4. The vertically coupled inductor of claim 1, wherein the first conductor has a first end and a second end, and wherein the first ferrite covers the first conductor from the first end to the second end.

5. The vertically coupled inductor of claim 4, wherein the second conductor has a third end and fourth end, and wherein the second ferrite covers the second conductor from the third end to the fourth end.

6. The vertically coupled inductor of claim 5, wherein the first end is conductively coupled to the third end through the substrate.

7. The vertically coupled inductor of claim 1, wherein cancellation of the magnetic fields generated by the first and second inductors prevents the magnetic fields from interfering with at least one component of a power converter placed on the substrate.

8. The vertically coupled inductor of claim 7, wherein an output voltage of the vertically coupled inductor is coupled to a controller of the power converter.

9. The vertically coupled inductor of claim 1, wherein the inductor is a three terminal device having an input terminal for the first conductor, an input terminal for the second conductor, and a common terminal for the first conductor and the second conductor.

10. The vertically coupled inductor of claim 1, wherein the first inductor has a quality factor greater than ten.

11. A vertically coupled inductor, comprising:
a first inductor having a first conductor with a first path on a first side of a substrate, the first inductor having a first ferrite with a second path on the first side of the substrate, the first ferrite extending along a length of the first conductor such that the second path corresponds to the first path; and
a second inductor having a second conductor with a third path on a second side of the substrate, the second inductor having a second ferrite with a fourth path on the second side of the substrate, the second ferrite extending along a length of the second conductor such that the fourth path corresponds to the third path, wherein the third path mirrors the first path.

12. The vertically coupled inductor of claim 11, wherein the first conductor is copper.

13. The vertically coupled inductor of claim 11, wherein the first path is a closed path with a rectangular shape and has a first end and a shared end.

14. The vertically coupled inductor of claim 13, wherein the second path mirrors the first path and has a second end and the shared end enabling flux cancellation within the interior area of the substrate defined by the closed path.

15. The vertically coupled inductor of claim 11, wherein the first ferrite is formed directly on the first conductor, and wherein the second ferrite is formed directly on the second conductor.

16. The vertically coupled inductor of claim 11, wherein the first conductor has a first end and a second end, and wherein the first ferrite covers the first conductor from the first end to the second end.

17. The vertically coupled inductor of claim 16, wherein the second conductor has a third end and fourth end, and wherein the second ferrite covers the second conductor from the third end to the fourth end.

18. The vertically coupled inductor of claim 17, wherein the first end is conductively coupled to the third end through the substrate.

* * * * *